July 18, 1961 H. A. WAGNER 2,993,153

SEAL

Filed Sept. 25, 1958

WITNESSES

Edwin E. Bassler

Robert A. Gerlach

INVENTOR

Howard A. Wagner.

BY Homer O. Blair

ATTORNEY

United States Patent Office 2,993,153

Patented July 18, 1961

2,993,153
SEAL

Howard A. Wagner, North Huntingdon Township, Westmoreland County, Pa., assignor to Westinghouse Electric Corporation, East Pittsburgh, Pa., a corporation of Pennsylvania Filed Sept. 25, 1958, Ser. No. 763,245
3 Claims. (Cl. 317—234)

This invention relates to hermetic seals and the method of manufacture thereof, and, more particularly, to hermetically sealed electronic devices having an electrical connection to an outside terminal.

It has been the general practice in the manufacture of electronic devices to use glass-to-metal seals to bring an electrically insulated terminal out through an envelope. This technique, although satisfactory in certain designs, is a relatively costly method and the finished device is subject to breakage when placed under mechanical strain during operation.

It is an object of this invention to provide an improved hermetic seal.

It is another object to provide an improved hermetically sealed semiconductor device.

It is a further object to provide an improved hermetically sealed semiconductor device suitable for automatic production techniques.

It is an additional object to provide an improved lead structure for hermetically sealed devices.

It is still another object to provide a method of manufacturing hermetically sealed devices.

It is an auxiliary object to provide an improved hermetically sealed device which is less subject to breakage under mechanical strain.

These and other objects of this invention will be apparent from the following description, taken in accordance with the accompanying drawing, throughout which like reference characters indicate like parts, which drawings form a part of this application and in which.

Figure 1:
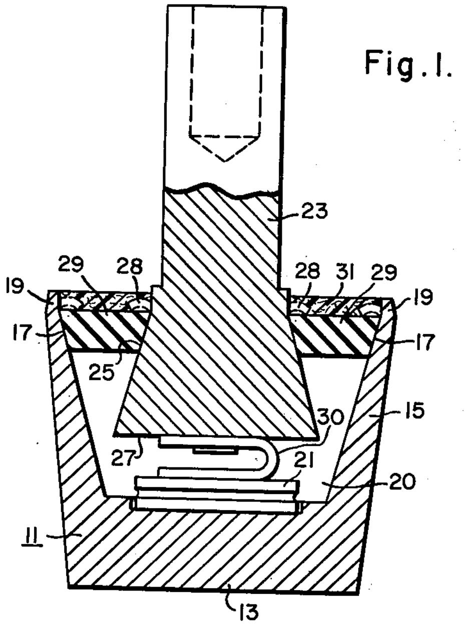
FIGURE 1 is a sectional view of one embodiment of this invention.

In FIG. 1 there is shown an envelope member 11 having a base portion 13 and a wall portion 15. The wall portion 15 is provided with a support surface 17 and a clamping member 19. A semiconductor device 21, which may be a diode, a transistor or any type of semiconducting device, is disposed in intimate contact with the internal surface of the base portion 13. In some instances it may be desirable to provide a thin insulating washer (not shown) around the semiconductor device 21 to insure that the device is not shorted out. A lead member 23 which may be electrically connected to external circuitry is positioned partially within a cavity 20 formed by the base portion 13 and the wall portion 15 of the envelope member 11 and spaced from the wall portion 15. The lead member 23 is provided with a support surface 25, a contact surface 27 and a clamping member 28. The contact surface 27 of the lead member 23 is connected by means of a contact spring 30 to one of the electrodes of the semiconductor device 21. The contact surface 27, the contact spring 30 and the surfaces of the semiconductor device 21 in contact with the contact spring 30 and the base portion 13 may, if desired, be tin plated to provide better electrical contact. Although the contact spring 30 is illustrated in one form only, it should be understood that the contact spring 30 may have any desired shape which will provide electrical contact between the lead member 23 and one surface of the semiconductor device 21. It may also be desirable in some instances to apply solder to the connections made between the contact surface 27 of the lead member 23 and the semiconductor device 21 and between the semiconductor device 21 and the base portion 13.

An insulating gasket member 29 may be disposed between the wall portion 15 of the envelope member 11 and the lead member 23 so that it rests on the support surfaces 17 and 25 of the wall portion 15 and the lead member 23, respectively. The gasket member 29 is held rigidly in place by means of the clamping members 19 and 28 which are integral with the wall portion 15 and the lead member 23, respectively. A layer 31 of insulating material covers the clamping members 19 and 28 and the gasket member 29 to provide a hermetically sealed cavity 20. If it is desirable that the lead member 23 be insulated from the wall portion 15 the gasket member 29 may be of a suitable insulating material such as a laminated plastic material, for example glass reinforced resin, or it may be of a ceramic such as glass. The coating 31 applied over the gasket member 29 and the clamping members 19 and 28 may be a suitable insulating material such as a siloxane resin as taught in copending application Serial No. 635,402, entitled "Siloxane to Metal Bond Insulation," by G. C. Gainer and E. J. Croop, filed January 22, 1957, and assigned to the same assignee as the subject application. It may also be an epoxy type compound as used in U.S. Patent 2,909,740, entitled "Resinous Molding Compositions and Structures Embodying Metallic Members Cast Therein," by M. P. Seidel et al., issued October 20, 1959, and assigned to the same assignee as the subject application. Also in some instances, it may be desirable to use glass as the coating 31. A suitable glass material may be made from a powder glass such as that known as Corning No. 7052 which is more completely described in U.S. Patent No. 2,560,593, Pask et al., issued July 17, 1951, and assigned to the same assignee as the subject application. Of course, the type of insulating material used as the sealant depends upon the conditions to which the device will be subjected to when it is in use. For example, if the device is to be subjected to high temperatures a material which will not deteriorate at those temperatures should be used.

Figure 2:
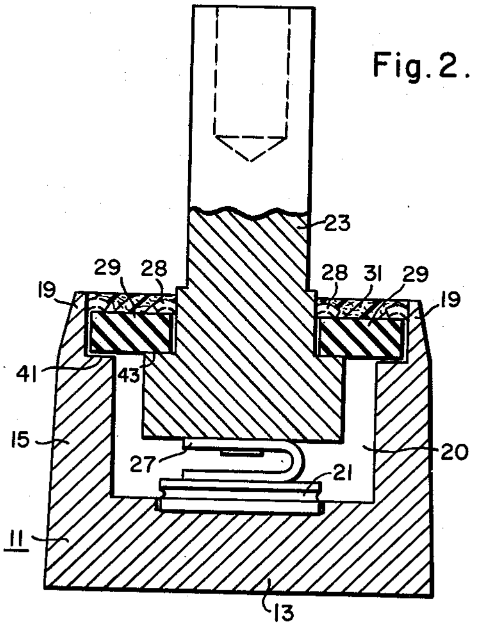
FIG. 2 is a sectional view of another embodiment of this invention.

FIG. 2 shows another embodiment of this invention in which the wall portion 15 of the envelope member 11 is provided with a ledge support portion 41 on the internal surface thereof. The lead member 23 is also provided with a ledge support portion 43 which is in substantial alignment with the ledge portion 41 of the wall portion 15 when the lead member 23 is inserted into the cavity 20 formed by the base portion 13 and the wall portion 15 of the envelope member 11. A suitable gasket member 29, when it is in proper position, will rest on the ledge portions 43 and 41 of the lead member 23 and the wall portion 15, respectively. In some instances it may be desirable to insert a thin insulating washer (not shown) between the gasket member 29 and the ledge portions 41 and 43 to prevent the sealing material 31 from sealing the semiconducting device 21. The gasket member 29 is held in place by the clamping members 19 and 28 which are integral with the wall portion 15 and the lead member 23, respectively. This particular embodiment has the advantage that the tolerances required for the ledge portions 41 and 43 and the gasket member 29 are much less than the tolerances necessary for the components of FIG. 1. If desired, the external surface of the wall portion 15 may be provided with threads (not shown) or the base portion 13 may be provided with a protruding threaded mounting member (not shown) for making connection to one terminal of the electronic device.

Figure 3:
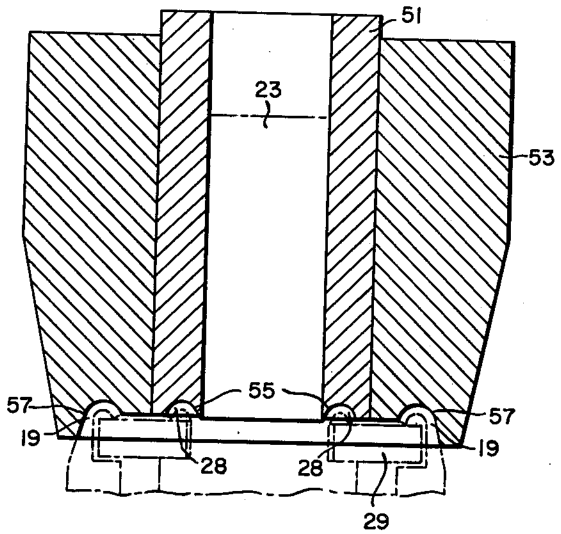
FIG. 3 is a sectional view of the die members used in one step of the manufacturing process in accordance with one embodiment of this invention.

In the preparation of this device the lead member 23 is inserted into the cavity 20 formed by the wall portion 15 and the base portion 13 so that it extends partially within the cavity 20. The gasket member 29 may be attached to the lead member 23 by deforming the clamping member 28 either before or after the lead member 23 is inserted into the cavity 20 and is in position with relation to the wall portion 15. If the latter procedure is used, that is, where the lead member 23 is inserted into the cavity 20 before the gasket member 29 is attached, the gasket member 29 is placed in position so that it rests on the support surfaces 17 and 25 of the wall portion 15 and lead member 23. Die members 51 and 53 shown in FIG. 3 are positioned concentric with the lead member 23 and with the application of pressure, deform the clamping members 19 and 28 over the gasket member 29 to rigidly hold the gasket member 29 in position. The die members 51 and 53 may be used in the position as shown in FIG. 3 to simultaneously deform the wall portion clamping member 19 and the lead member clamping member 28 or they may be used individually to first deform one of the clamping members and then the other. The die member 51 which is used to deform the lead clamping member 28 is provided with a cutting edge 55 so that a portion of the lead member 23 may be sheared away from the main body thereof and deformed over the gasket member 29 to provide a clamping means. The lead member 23 may be machined so that only a bending force, and not a shearing force would be required to deform the clamping member 28 over the gasket member. The die member 53 utilized to deform the wall clamping member 19 is provided with deforming portions 57 which will act under pressure to deform the wall clamping member 19 over the gasket member 29. A layer 31 of sealing material is then applied over the clamping members 19 and 28 and the gasket member 29 to provide a hermetically sealed device.

If desired, the gasket member 29 may be secured to the lead member 23 before the lead member 23 is inserted into the cavity 20. If this procedure is followed, the gasket member 29 is positioned on the lead member 23 so that it rests on support surface 25. The die member 51 is then positioned concentric with the lead member 23, and the lead clamping member 28 is deformed to hold the gasket member 29 in place between the clamping member 28 and the support surface 25. The lead member 23 containing the gasket member 29 is then inserted into the cavity 20 and the wall clamping member 19 is deformed over the gasket member 29 by means of die member 53.

Of course, it should be understood that the configuration of the semiconductor device 21 shown in FIGS. 1 and 2 is for illustrative purposes only and it should not be so limited. The semiconductor device 21 may have any suitable configuration such as a different number of layers, layers of different widths, etc.

Several hundred diodes have been encapsulated in this manner and tested under high humidity conditions without failure. It is estimated that this type of seal will save over two-thirds of the cost of previous glass type seals and will make economically possible the application of three phase silicon rectifiers and alternating-current generators for automotive use. Not only is an economical savings possible in the manufacture of this device but a savings due to breakage in the field because of mechanical strain.

While the present invention has been shown in a few forms only, it will be obvious to those skilled in the art that it is not so limited but is susceptible of various changes and modifications without departing from the spirit and scope thereof.

I claim as my invention:

1. A hermetically sealed device including an envelope member having a base portion and a wall portion integral with said base portion, said wall portion and said base portion defining a cavity, said wall portion including a support surface, a lead member providing an external electrical connection positioned partially within said cavity and spaced from said wall portion, said lead member having a support surface and a contact portion, a semiconductor structure in intimate contact with said base portion of said envelope member and said contact portion of said lead member, an insulating gasket member disposed on said support surfaces of said wall portion and said lead member to insulate said lead member from said envelope member, a first clamping means integral with said lead member and a second clamping means integral with said wall portion, said first and second clamping means being operable in conjunction with said support surfaces to hold said gasket member in position with respect to said envelope member and said lead member and an insulating sealing material deposited over said gasket member and said clamping means to hermetically seal said device.

2. A hermetically sealed semiconductor device including a conductive envelope member having a base portion and a wall portion integral with said base portion, said wall portion and said base portion defining a cavity, said wall portion including a support surface, a lead member providing an external connection positioned partially within said cavity and spaced from said wall portion, said lead member having a support surface and a contact portion, a semiconductor structure in intimate contact with said base portion of said envelope member and said contact portion of said lead member, an insulating gasket member disposed on said support surfaces of said wall portion and said lead member to insulate said lead member from said envelope member, a first clamping means integral with said lead member and a second clamping means integral with said wall portion, said first and second clamping means being operable in conjunction with said support surfaces to hold said gasket member in position with respect to said envelope member and said lead member, and an insulative sealing material deposited over said gasket member and said clamping means to hermetically seal said semiconductive device.

3. A hermetically sealed semiconductor device including a conductive envelope member having a base portion and a wall portion integral with said base portion, said wall portion and said base portion defining a cavity, said wall portion including a ledge support portion on the internal surface thereof, a lead member providing an external connection positioned partially within said cavity and spaced from said wall portion, said lead member having a ledge support portion and a contact portion, said ledge support portion of said lead member being in substantial alignment with said ledge support portion of said wall portion, a semiconductor structure in intimate contact with said base portion of said envelope member and said contact portion of said lead member, an insulating gasket member disposed on said ledge support portions of said wall portion and said lead member to insulate said lead member from said envelope member, a first clamping means integral with said lead member and a second clamping means integral with said wall portion, said first and second clamping means being operable in conjunction with said ledge support portions to hold said gasket member in position with respect to said envelope member, and said lead member and an insulating sealing material deposited over said gasket member and said clamping means to hermetically seal said semiconductor device.

References Cited in the file of this patent

UNITED STATES PATENTS

| | | |
|---|---|---|
| 2,790,940 | Prince | Apr. 30, 1957 |
| 2,806,187 | Boyer et al. | Sept. 10, 1957 |
| 2,813,326 | Liebowitz | Nov. 19, 1957 |
| 2,825,014 | Willemse | Feb. 25, 1958 |
| 2,836,878 | Shepard | June 3, 1958 |
| 2,837,703 | Lidow | June 3, 1958 |
| 2,863,105 | Ross | Dec. 2, 1958 |